Nov. 19, 1963 O. BETTINGER 3,111,631
AUTOMATIC GAIN CONTROL CIRCUIT FOR IF-AMPLIFIERS
OF A LARGE BANDWIDTH
Filed Aug. 20, 1959
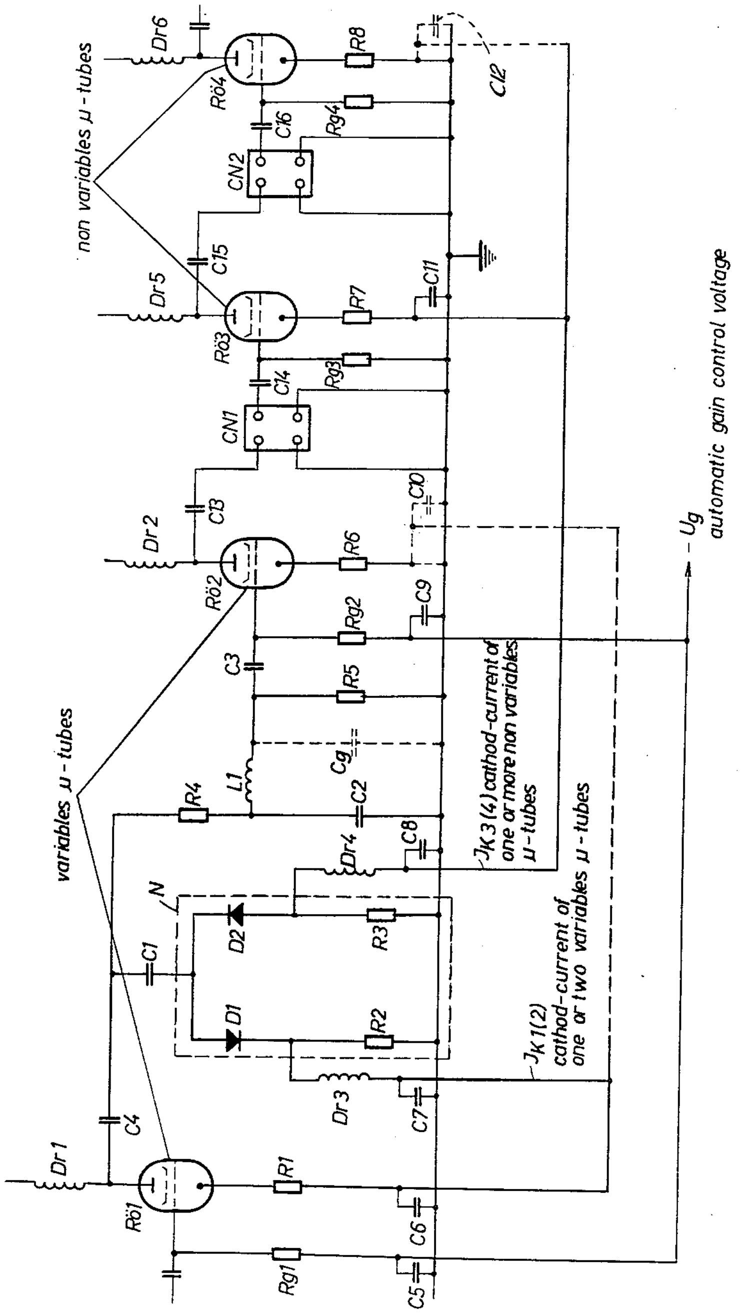
INVENTOR.
BY
Agent 3,111,631

AUTOMATIC GAIN CONTROL CIRCUIT FOR IF-AMPLIFIERS OF A LARGE BANDWIDTH

Oskar Bettinger, Pforzheim, Germany, assignor to International Standard Electric Corporation, New York, N.Y., a corporation of Delaware Filed Aug. 20, 1959, Ser. No. 835,009
Claims priority, application Germany Aug. 22, 1958
4 Claims. (Cl. 330—133)

The present invention relates to an automatic control circuit for wide-band intermediate-frequency amplifiers in which for achieving a large range of control, there is varied besides the grid bias, also the resistance of a damping network.

In the case of intermediate-frequency amplifiers of a large bandwidth there are mostly used band-pass filters as coupling networks between the amplifier tubes. In order to prevent the product of bandwidth times amplification from being reduced, the band-pass filters are in these arrangements only tuned to the tube capacities. According to the prior art it is already known to effect a gain control by a variation of the negative grid bias of the amplifier tubes. Modern types of wide-band amplifier high $\mu$-tubes especially bear the disadvantage that their grid input capacitance and their grid input resistance are functions of the grid bias or of the anode current respectively. On account of this, in particular with respect to amplifiers which are coupled to band-pass filters, there arise certain difficulties in keeping the transmission curve of the amplifier constant in the event of a variation of the grid bias.

For overcoming these difficulties it has already become known to subject one or two stages of an amplifier to an extremely strong attenuation, and to carry out the gain control only on these strongly attenuated stages. However, also in these arrangements the disadvantages are still considerable, because extremely attenuated stages hardly contribute towards the amplification, furthermore it is also doubtful whether with one or two of such stages it is still possible to achieve a range of control of e.g. 40 db and more.

Furthermore there are known gain control circuits for broadcast receivers in which a voltage- or current-dependent resistor respectively, is connected in parallel with the oscillating circuit, whereby the latter is subjected to a more or less strong attenuation in dependency upon the control voltage, so that the gain factor on the whole is varied in dependency upon the control voltage. In the course of this, however, the high-ohmic control voltage has to be converted, e.g. by means of an additional cathode amplifier, into a low-ohmic source of voltage, in order to be capable of effectively acting upon the voltage- or current-dependent resistor respectively. In addition thereto, in the case of these control circuits, according to their other purpose, there is exclusively made use of the attenuation of the oscillating circuit, in order to simultaneously achieve an enlargement of the bandwidth of the amplifier as the control operation is started. In contrast thereto, however, in the case of wide-band amplifiers there is supposed to be achieved a large as possible range of control by maintaining constant transmission properties.

According to the invention there is now proposed an automatic gain control circuit for the use with wide-band intermediate-frequency amplifiers. In an embodiment of the invention only the first two amplifier tubes are controlled by the AGC voltage in the conventional manner. Also, a variable network acting as a purely ohmic attenuation resistance is connected in parallel to a coupling quadripole, a two terminal network having four accessible terminals grouped in pairs. The connection is made at the junction of the anode of the first control tube and the input resistance to the coupling quadripole. The invention is characterized by the fact that the resistance of the network is varied automatically in the way of an additional gain control in dependency upon the difference of the controlled and uncontrolled cathode currents of the amplifier tubes.

In the following the invention will now be described with reference to the accompanying drawing representing an exemplified embodiment of a circuit arrangement on which the invention is based:

In the FIGURE there are represented four tube-stages of a wide-band amplifier. According to the required gain factor of the amplifier, still further tube stages are provided for which are not represented, however, as their circuit arrangements do not differ from the stage of tube 4, indicated by a solid line.

The tubes Rö1 and Rö2 are control tubes. Their control voltage $-Ug$ is supplied via their grid resistors $Rg1$ and $Rg2$. The whole range of control of the wide-band amplifiers is achieved by means of them. The anode voltage is supplied to them via the reactances $Dr1$ and $Dr2$.

The tubes Rö3 and Rö4 and all other tubes of the amplifier are noncontrolled tubes. Their grids are therefore connected with mass via the grid resistors $Rg3$ or $Rg4$, respectively, in the conventional manner. The anode voltages are supplied to them via the reactances $Dr5$ and $Dr6$. The tube Rö2 is coupled with the tube Rö3, and the tube Rö3 with the tube Rö4 via the capacitors C13 and C14 and the coupling network CN1 respectively C15 and C16 and the coupling network CN2. The coupling networks are designed in a manner conventional with wide-band amplifier.

The flowing-off of the high frequency over the lines of the control voltage or over the cathode-lines of the tubes Rö3 and Rö4, respectively, is prevented by the capacitors C5 through C12 which are designed as current-flow capacitors. The cathode-current $JK_{1(2)}$ of at least one of the controlled tubes, i.e. the cathode-current of Rö1 and if necessary also the cathode-current of Rö2 (as may be seen from the connection from R6 to $Dr3$, indicated by a dash-line) is fed to mass via the resistor R2 of the network N. Thus the total cathode-resistance of Rö1 is R1+R2.

The cathode-current $JK_{3(4)}$ of at least one of the noncontrolled tubes, e.g. the cathode-current of Rö3 and if necessary also the cathode-current of Rö4 (as may be seen from the connection from R8 to $JK_{3(4)}$, indicated by a dash-line) is supplied to mass via the resistor R3 of the network N. Thus the whole cathode-resistor of Rö3 is R7+R3. To the control grid of the tube Rö1 there is fed the wideband intermediate-frequency signal, and is then transferred via the coupling capacitor C4 and across the resistor R4 to the coupling quadripole consisting of the grid input capacitance $Cg$ of the following tube (indicated by the dashlines), of the inductance L1, and of the coupling capacitance C2, which coupling quadripole is terminated by the resistor R5 with its characteristic impedance. This coupling quadripole is connected via the capacitor C3 with the control grid of the second amplifier tube Rö2. Of course, instead of the coupling quadripole there can also be used any type of coupling arrangement whose input resistance is real throughout the transmission band, and remains constant.

The network N serving to separate the direct current towards mass via the capacitor C1, now represents a purely ohmic shunt branch in relation to the coupling quadripole as connected across the resistor R4. The variable resistance thereof determines the voltage as appearing at the input of the coupling quadripole.

The network consists of two diodes D1 and D2 which are connected with each other and are of an opposite polarity, said diodes being respectively connected with mass across the resistors R2 or R3 respectively. At the same time the cathode current $JK_{1(2)}$ of one or two controlled tubes (indicated by dashlines) is conducted on one hand via the high-frequency reactance D*r*3 and across the resistor R2, and the cathode current $JK_{3(4)}$ of at least one uncontrolled tube is conducted, on the other hand, via the high-frequency reactance D*r*4 and across the resistor R3 towards mass. The biasing potential for the diodes is determined by the difference of the voltage drops across the resistors R2 or R3 respectively. When taking care that in the non-controlled condition the current flowing across the resistor R2 is greater than or equal to the current flowing across the resistor R3, then the diodes with the difference voltage between the resistors R2 and R3 are blocked. Accordingly, the network has a high resistance. In the controlled condition the anode or plate currents of the controlled tubes will become smaller and, consequently also the voltage drop across the resistor R2. Since the current of the non-controlled tubes remains constant across the resistor R3, there is effected a polarity reversal of the difference voltage across R2/R3, the diodes become conductive, and the network becomes low-ohmic. In this way there is achieved an additional control which, in addition, to a considerable extent eliminates the deviations from the transmission curve or characteristic as caused by the normal control.

With the aid of a series resistance R4, lying almost in the order of magnitude of the low-ohmic forward resistance of the network, it is possible to dimension the range of control. With respect to the dimensioning of this particular resistance the following viewpoints are decisive:

For achieving a large range of control the resistance R4 must be chosen as high as possible. However, a high resistance R4 bears the disadvantage that in the non-controlled case, that is, in the case of a high-ohmic network, the detrimental influence of the anode reactance D*r*1 and of the anode capacitance of tube 1 becomes stronger noticeable with respect to the transmission curve or characteristic. When considering, however, that in this particular case, on account of the poorer signal-to-noise ratio, the increased distortions will hardly be noticeable, this advantage only needs to be regarded as being of minor importance.

Since, furthermore, in the case of blocked diodes and due to the fed-in current, merely an additional voltage appears at the resistor R4 which, on account of the demanded bandwidth, cannot be utilized, it is appropriate to choose the resistance R4 in such a way that it will not be included in the maximum amplification (gain).

It should be noted that diodes D1, D2 could represent voltage or current dependent resistors such as varistors or thermistors. For example, if varistors were used a sufficient potential difference caused by the voltage drops across R2 and R3 would lower the resistance of the variable network.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A wide band automatic gain controlled IF-amplifier comprising at least first and second stages of amplification having automatic gain control, at least a third stage of amplification having no automatic gain control, each of said stages comprising an electronic device having at least electron-emission and control electrodes, means for providing said automatic gain control by applying a variable direct current bias to the control electrodes of said first and second stages, means for applying a fixed direct current bias to the control electrode of said third stage, an input terminal for receiving wide band IF input signals coupled to the control electrode of said first stage, an output terminal connected to the output of said third stage, coupling means for connecting said first, second, and third stages in cascade, quadripole circuit means included in the coupling between said first and second stages for providing a constant D.C. resistance over said wide band, means comprising a variable network connected in shunt with said quadripole means for providing purely ohmic damping resistance, said variable network including a first resistor connected in series with the electron-emission electrode of said first stage, a second resistor connected in series with the electron-emission electrode of said third stage, said first and second resistors carrying current to the associated electron-emission electrodes, and said network comprisong compensating means connected from said first and second resistors to the coupling means between said first and second stages for varying said ohmic resistance of said network to control the attenuation of said first and second stages responsive to a difference in the current traversing said first and second resistors thereby maintaining constant transmission properties of said amplifier and providing a substantially constant output signal amplitude at said output terminal throughout a wide range input signal amplitude.

2. An IF-amplifier as claimed in claim 1 wherein said compensating means comprises first and second oppositely polarized diodes which are series connected between respective ones of said first and second resistors, means for connecting the junction point of said diodes to said coupling means between said first and second stages, means for connecting the side of each said resistors not connected to said diodes to ground, means for connecting the junction point of said first resistor and said first diode to the means for connecting the junction point of said second resistor and second diode to the electron-emission electrode of said third stage whereby said diodes are biased in a forward or backward direction by the differences of voltage drop produced across said resistors.

3. An IF-amplifier as claimed in claim 2 wherein said compensating means comprises a pair of voltage- or current-dependent resistors, such as thermistors.

4. An IF-amplifier as set forth in claim 1 wherein the said coupling means between said first and second stages includes a series resistor of an order of magnitude approximating the low forward resistance of said network, whereby a large range of overall amplifier gain is provided with constant transmission properties.

References Cited in the file of this patent

UNITED STATES PATENTS

| | | |
|---|---|---|
| 2,200,062 | Groeneveld | May 7, 1940 |
| 2,406,977 | Wendt | Sept. 3, 1946 |
| 2,676,214 | Van Weel | Apr. 20, 1954 |
| 2,794,865 | Black et al. | June 4, 1957 |